Patented Nov. 28, 1950

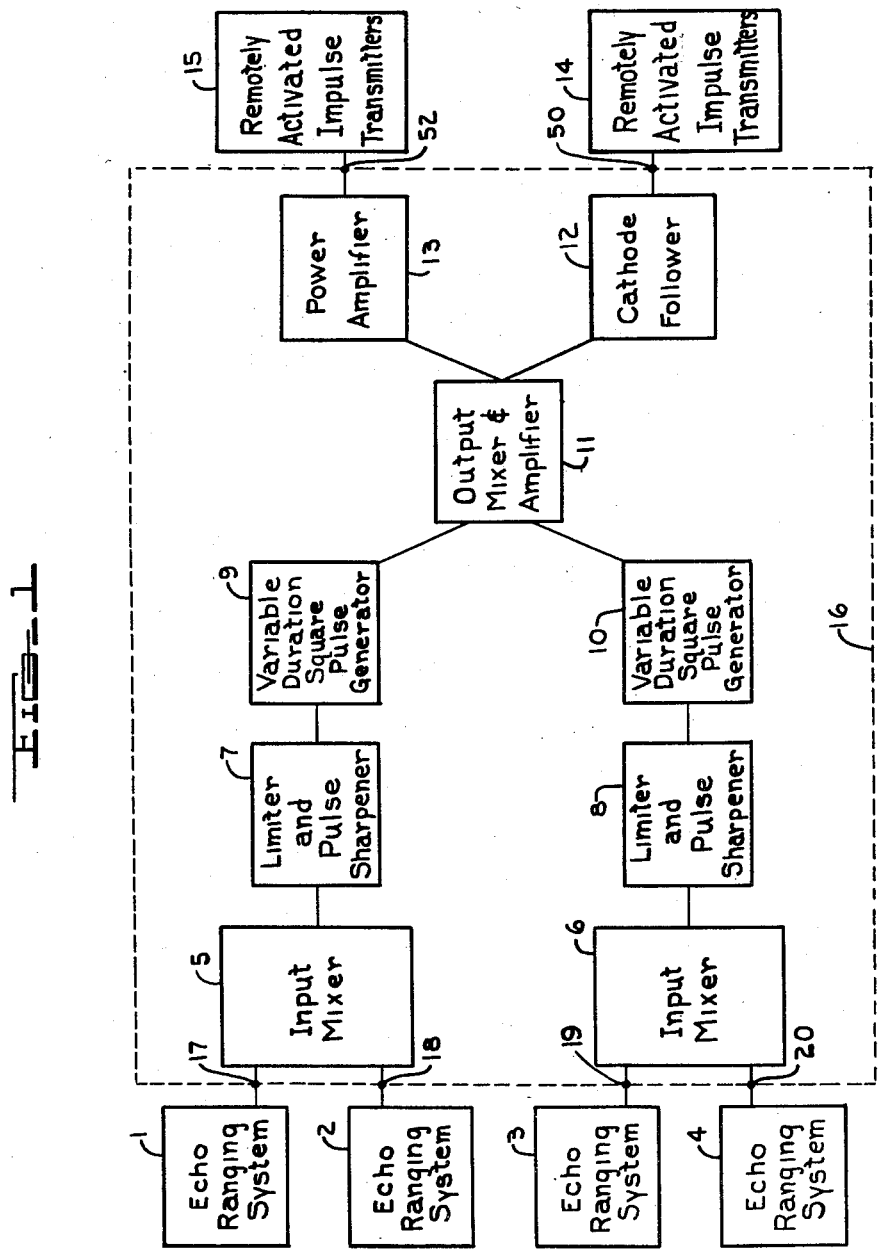

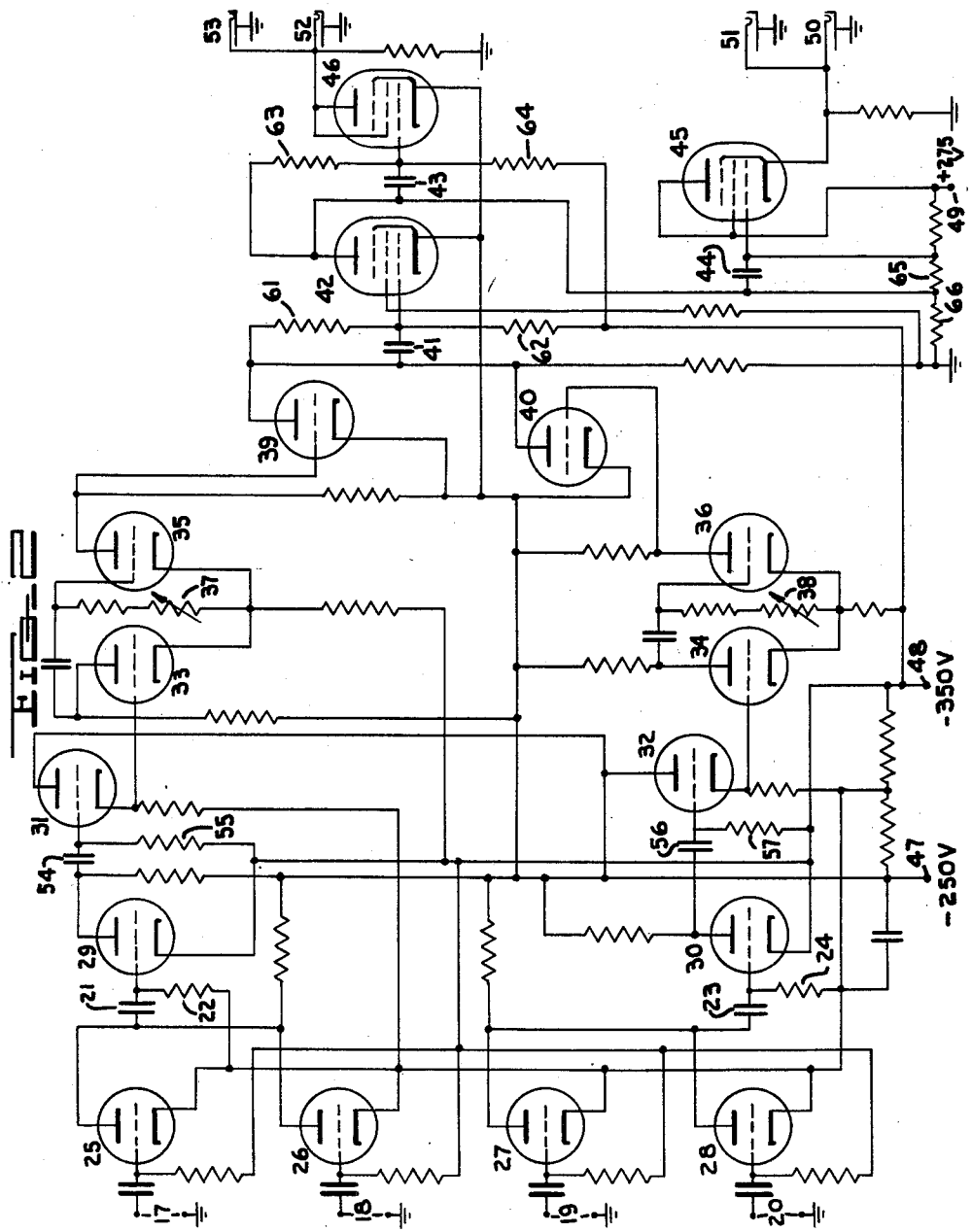

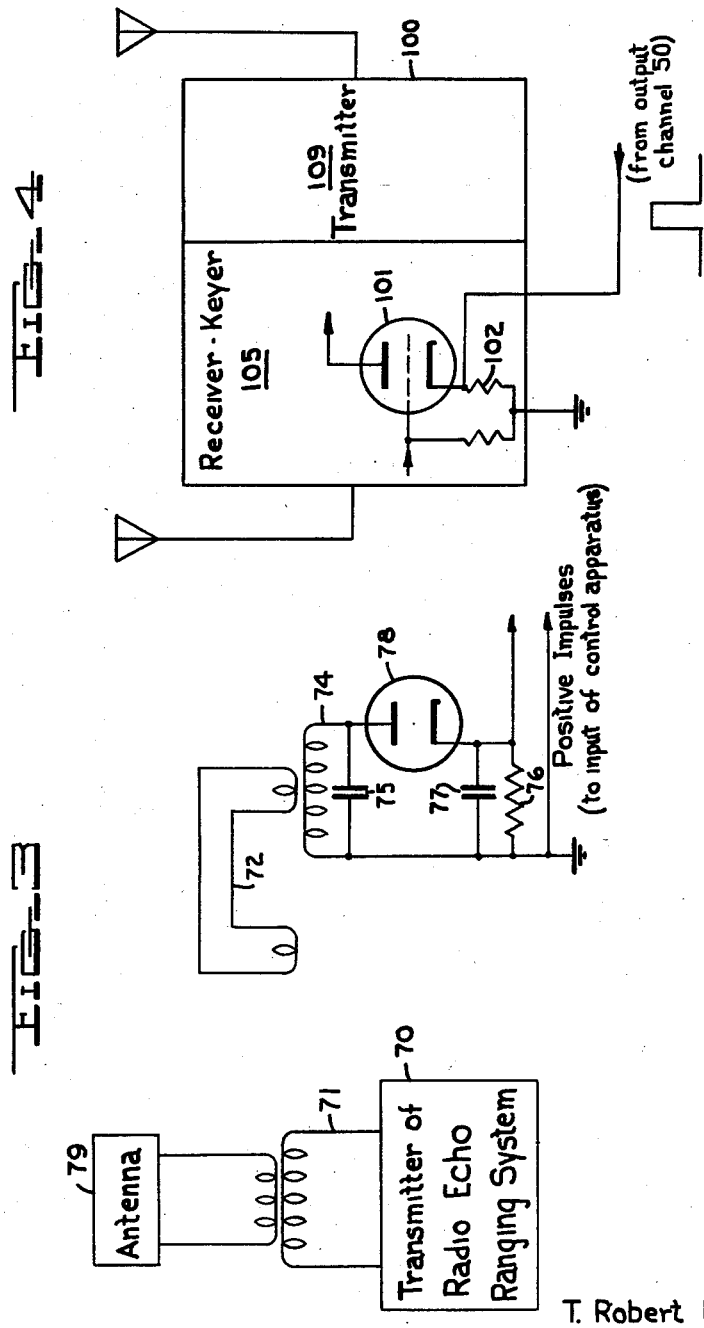

2,531,393

UNITED STATES PATENT OFFICE 2,531,393

ELECTRONIC COORDINATING SYSTEM

T. Robert Burnight, Washington, D. C., and John F. Clark, Jr., United States Navy Application June 8, 1945, Serial No. 598,350

9 Claims. (Cl. 343—6)

(Granted under the act of March 3, 1883, as amended April 30, 1928; 370 O. G. 757)

This invention relates to coordination of operation of radio echo ranging systems and impulse transmitters automatically responsive to a remotely transmitted signal.

Radio echo ranging systems recurrently transmit impulses and receive echoes thereof from remote obstacles. The transmitted impulses have a duration of the order of a few microseconds, and normally recur at a frequency lying in the low audio range. The echo-receiver is normally insensitive, but is rendered operative for a short interval following each operation of the transmitter. For instance, to receive echoes from a range up to 40 nautical miles, the receiver must be operative for a period of 495 microseconds after a transmitted impulse.

For navigational and identification purposes other impulse transmitters are employed which are automatically responsive to a remotely transmitted signal which is usually of an impulse character. A remote aircraft may activate such a beacon transmitter recurrently for a limited period of time by transmitting the requisite signal.

The operation of the beacon transmitter is manifestly not under control at the local installation. Under many circumstances ranging systems and beacons must be installed in close proximity, and the broad frequency spectrum of the impulse type signals employed by the beacons results in disabling interference with the ranging systems. The operation of the ranging systems, however, normally requires only isolated intervals aggregating a minor fraction of the elapsed time of their employment.

It is accordingly an object of this invention to permit operation of remotely activated impulse transmitters during inoperative periods of an echo-ranging installation.

It is a further object of the invention to effect coordinated simultaneous employment of echo-ranging and remotely activated signalling systems.

The invention will be described with reference to the appended exemplary drawings, of which:

Figure 1 is a block diagram of an installation comprising four echo ranging systems, coordinating apparatus, and a plurality of remotely activated signalling systems;

Figure 2 is a schematic diagram of an embodiment of the coordinating apparatus shown in block form in Figure 1;

Figure 3 is a showing, partly schematic and partly in block form, of one means by which control voltage for keying the coordinating apparatus may be obtained from an echo-ranging system;

Figure 4 is a drawing, partly schematic and partly in block form, showing one means by which output voltage from the coordinating apparatus can be employed to control a remotely-activated signalling system.

Referring to Figure 1, echo-ranging system 1 is coupled to coordinating apparatus 16 in any manner operative to cause a control voltage to appear at input 17 of coordinating apparatus 16 when ranging system 1 transmits a pulse of energy. The magnitude and duration of this voltage may lie anywhere within wide limits. In a specific construction, the control voltage could be an impulse of any amplitude between 5 and 300 volts and any duration between 0.5 and 50 microseconds.

Echo ranging systems 2, 3 and 4 supply control voltage respectively to inputs 18, 19 and 20. Ranging systems 1 and 2 are adjusted to show echoes from substantially the same maximum range; ranging systems 3 and 4 likewise are set for the same maximum range, which may be different from that for which systems 1 and 2 are operative.

The control impulses at terminals 17 and 18 are combined in mixer circuit 5. The voltage impulses appearing at the output of mixer circuit 5 are passed through limiting and sharpening circuit 7. The impulses at the output of circuit 7 are of uniform amplitude and very short duration. Each impulse at the output of circuit 7 coincides in time with the leading edge of an impulse applied at terminals 17 or 18. Mixer 6 and limiting and sharpening circuit 8 function in the same manner as circuits 5 and 7 except that circuits 6 and 8 are actuated by control impulses applied to input terminals 19 and 20 by ranging systems 3 and 4.

The short-duration impulses at the output of circuit 7 are employed to trigger the rectangular voltage generator 9. The duration of the rectangular voltage impulses produced by circuit 9 may be varied within wide limits and should be adjusted to be slightly greater than the sensitive period characteristic of the receivers in ranging systems 1 and 2. The impulses at the output of circuit 8 are similarly employed to trigger rectangular voltage generator 10. The duration of the rectangular impulses at the output of circuit 10 is variable, and it should be set to a value slightly greater than the sensitive interval characteristic of the receivers in ranging systems 3 and 4.

The rectangular voltage waves at the output of circuits 9 and 10 are combined, limited and amplified in circuit 11. The output of circuit 11 is connected to the input of cathode follower 12 and to the input of power amplifier 13. The output of cathode follower 12 goes to output channel 50; that of power amplifier 13 goes to output channel 52. The potential at output channels 50 and 52 is zero relative to ground so long as no ranging receiver is sensitive to signals. When any of the ranging systems sends out an impulse, a substantial positive voltage appears at output channel 50, remaining for the duration of the rectangular impulse produced at the output of circuit 11. Simultaneously, a negative voltage appears at output channel 52, continuing for the same interval of time. Either of these control or "gate" voltages may be used to render the remotely-activated signalling systems inoperative. Dual output channels affording control voltages of either polarity are provided because some impulse-transmitter installations may be readily suppressed with a positive control voltage while others are better adapted for use with a negative deactivating voltage. Figure 1 shows a group of impulse transmitters controlled by each output channel.

If during a sensitive period of the receiver in ranging system 1 or 2, system 3 or 4 sends out an impulse, the voltages at output channels 50 and 52 remain positive and negative respectively until both receivers are insensitive to signals. Then the potentials at the output terminals return to zero and the impulse transmitters resume normal operation until the next time a ranging system sends out an impulse.

The stages in the coordinating apparatus are conductively coupled from the rectangular voltage generators through to the output channels, so that there is no time limit on the duration of the output control voltages.

Figure 2 shows a detailed schematic diagram of an exemplary embodiment of the coordinating apparatus shown in block form in Figure 1. In this embodiment positive control impulses from the echo-ranging systems may be fed in at jacks 17, 18, 19 and 20. Tubes 25, 26, 27 and 28 are the input mixer tubes represented in Figure 1 by blocks 5 and 6. The limiter and impulse sharpener elements, shown in Figure 1 as blocks 7 and 8, comprise tubes 29 and 31, in the upper channel, and tubes 30 and 32, in the lower channel. The mixer tubes are coupled to tubes 29 and 30 respectively by resistance-capacitance circuits 21, 22 and 23, 24, which have very short time constants. Other short time-constant coupling circuits 54, 55 and 56, 57 are used to couple tube 29 to tube 31 and tube 30 to tube 32 respectively. As a result of the operation of these circuits, together with the large negative bias on tubes 31 and 32, the trigger impulses appearing at the cathodes of tubes 31 and 32 are of about one-half microsecond duration.

The rectangular voltage generator circuits, shown in Figure 1 as blocks 9 and 10, comprise tubes 33, 35 and tubes 34, 36 respectively, connected as cathode-coupled multivibrators having a stable state and an unstable state. Either of the multivibrators may be thrown into its unstable state by a positive impulse applied to the grid of its normally non-conducting tube, which in the upper channel is tube 33 and in the lower channel is tube 34. Trigger impulses for this purpose are applied to the grid of tube 33 by tube 31 and to the grid of tube 34 by tube 32. The duration of the unstable state, and thus the duration of the output rectangular voltage impulses from the multivibrators, may be varied within wide limits with variable resistors 37 and 38 for the upper and lower channels respectively.

The rectangular voltage waves produced by the two multivibrators are applied by direct coupling respectively to the grids of tubes 39 and 40 which are part of the circuit represented in Figure 1 by block 11. The rectangular waves from the two multivibrators are combined and limited by tubes 39 and 40, with their associated circuit. The plates of tubes 39 and 40 are connected together and conductively coupled through voltage divider 61, 62 to the control grid of tube 42, which with its associated circuit comprises the remainder of block 11 in Figure 1. Immediate dynamic circuit response is effected by small capacitance 41 connected from the plates of tubes 39 and 40 to the control grid of tube 42.

The output of tube 42 is conductively coupled to tube 46 through voltage divider 63, 64 and to tube 45 through voltage divider 65, 66. Immediate dynamic response in these coupling circuits is achieved by small condensers 43 and 44.

Tube 45 is the cathode follower shown in Figure 1 as block 12. Its grid is normally biased below plate current cutoff, so that its cathode, which is connected to output jacks 50 and 51, is normally at ground potential. When a rectangular voltage impulse from either multivibrator is impressed on the circuit, the grid of tube 45 is made more positive, plate current flows in tube 45, and a positive voltage appears at output jacks 50 and 51, remaining so long as either multivibrator is producing a rectangular impulse.

Tube 46 is the power amplifier shown in Figure 1 as block 13. Its grid is normally biased below plate current cutoff, and its plate, which is connected directly to output jacks 52 and 53, is normally at ground potential. When a rectangular impulse from either multivibrator is impressed on the circuit, the grid of tube 46 is made more positive, plate current flows in tube 46, its plate drops below ground potential, and a negative voltage appears at output jacks 52 and 53, remaining so long as either multivibrator is producing a rectangular impulse.

The positive control impulses applied to the input of this embodiment of the coordinating apparatus may be obtained from the ranging systems in any convenient manner. The impulses may vary within wide limits as to amplitude and duration, the major requirement being that the pulses must occur simultaneously with the transmission of radio energy impulses by the ranging system. Most echo-ranging installations have suitable impulses available at one or more points in the timing circuit.

Simple apparatus for obtaining positive control impulses from an echo-ranging system is shown in Figure 3. Block 70 represents the transmitter of a ranging system; coil 71 represents a portion of the resonant circuit in which the system produces radio frequency currents during its intervals of transmission. Coil 71 is shown inductively coupled to the antenna of the ranging system which is represented by block 79. Also loosely coupled to coil 71 through coupling link 72 is the tank circuit composed of coil 74 and condenser 75 in parallel, which is resonant at the radio frequency produced by the ranging system. One side of tank circuit 74, 75 is grounded; the other side is connected to the plate of diode 78. The cathode of diode 78 is returned to ground through resistor 76 and condenser 75 in parallel. The time constant of capacitance-resistance circuit 75, 76 is long relative to a radio frequency period but short relative to the duration of the transmitted impulse of radio energy. When an impulse is transmitted by the ranging system, an impulse positive with respect to ground will appear at the cathode of diode 78. This impulse may be used as a control voltage at the input of the coordinating apparatus herein described.

In Figure 4 a simple method is shown for using the positive control voltage produced at the output of the control apparatus to desensitize a remotely-activated signalling system. The block 100 in Figure 4 represents the signalling system including the impulse transmitter 109 and its associated receiver-keyer apparatus 105. In normal operation the receiver-keyer receives radio signals from remote points and responsively thereto keys the transmitter, causing it to send out impulses of radio energy. Tube 101, the tube to be controlled by the coordinating apparatus, is shown in schematic form as a part of receiver-keyer 105. It may be any tube in the signal channel of the receiver-keyer. If the receiver employs a super-regenerative detector tube, it may be convenient to apply the control voltage to that tube. The cathode of tube 101 is connected to ground through resistor 102. The positive output of the coordinating apparatus is applied to tube 101 between cathode and ground. When no voltage is present at the output of the coordinating apparatus, tube 101 is free to operate normally. When, in response to an impulse from a ranging system, the voltage at the output of the coordinating apparatus assumes a positive value, the cathode of tube 101 is raised to a positive potential such that the tube is blocked and rendered wholly inoperative. Hence neither the receiver-keyer nor the impulse transmitter can function so long as the positive voltage from the coordinating apparatus persists.

The voltage from the negative output channel of the coordinating apparatus will perform a similar function when connected in the grid-return circuit of the tube to be controlled in the receiver-keyer.

It will be understood that the embodiments shown and described are exemplary only, and that the scope of the invention will be determined with reference to the appended claims.

The invention described herein may be manufactured and used by or for the Government of the United States of America for governmental purposes without the payment of any royalties thereon or therefor.

What is claimed is:

1. In combination, an impulse echo ranging system; a remotely-actuated impulse transmitting system; and control means for the transmitting system operative to desensitize the same in response to the reception of pulses from said ranging system.

2. In combination, a radio echo ranging system; a remotely-actuated impulse transmitting system; and control means for the transmitting system operative to desensitize the same in response to the reception of pulses from said ranging system and to reestablish sensitivity thereof after a predetermined time interval.

3. In combination, a radio-echo ranging system; a remotely-activated impulse transmitting system; and control means for the transmitting system operative to desensitize the same responsively to operation of the ranging system for a period including the maximum return period of desired echoes from said ranging system.

4. In combination, a recurrently operative radio echo ranging system; a remotely activated impulse transmitting system; and control means for the transmitting system operative to desensitize the same responsively to operation of the ranging system for a period including the maximum return period of desired echoes, and before the next ranging operation.

5. In combination, first and second radio echo ranging systems; a remotely activated impulse signalling system; first control means for the signalling system operative responsively to the operation of the first ranging system to desensitize the signalling system for a predetermined time interval including the maximum return period of desired first system radio echoes; and second control means for the signalling system operative responsively to the operation of the second ranging system to desensitize the signalling system for a predetermined time interval including the maximum return period of desired second system radio echoes.

6. In combination, a recurrently operative radio echo ranging system; a remotely activated impulse signalling system; a voltage generator; control means operative responsively to operation of the ranging system to cause the voltage generator to initiate a control voltage continuing for the maximum return period of desired radio echoes; and circuit means coupling the voltage generator to the signalling system operative to desensitize the signalling system during the duration of the control voltage.

7. In combination, a plurality of recurrently operative radio echo ranging systems; a remotely activated impulse signalling system; a voltage generator; control means coupled to the ranging systems operative responsively to each ranging operation to cause the voltage generator to initiate a control voltage continuing for the maximum return period of desired radio echoes; and circuit means coupling the voltage generator to the signalling system operative to desensitize the signalling system during the duration of the control voltage.

8. In combination, a plurality of recurrently operative radio echo ranging systems; a remotely activated impulse signalling system; control elements equal in number to the ranging systems, each control element coupled to one ranging system, responsive to the ranging operations thereof and operative to produce trigger impulses coincident with the initiation of each ranging operation; relay means equal in number to the control elements, each relay means governed by the trigger impulses from a control element and operative responsively to each trigger impulse to produce a signal voltage of predetermined duration; signal combining means conductively coupled to all of said relay means operative to produce an output voltage during operation of any of said relay means; and means conductively coupled to the signal combining means operative to desensitize the signalling system responsively to the output voltage from the signal combining means.

9. The recurrently operative radio echo ranging systems; a remotely activated impulse signalling system; multivibrator means having a stable state and an unstable state of predetermined time duration which may be initiated by a control voltage; means coupling the ranging systems to the multivibrator means operative to apply thereto a control voltage coincident with operation of either ranging system; and means coupling the multivibrator to the signalling system operative to desensitize the signalling system while the multivibrator means is in the unstable state.

T. ROBERT BURNIGHT.
JOHN F. CLARK, Jr.

REFERENCES CITED

The following references are of record in the file of this patent:

UNITED STATES PATENTS

| Number | Name | Date |
|---|---|---|
| 2,189,549 | Hershberger | Feb. 6, 1940 |
| 2,405,238 | Seeley | Aug. 6, 1946 |
| 2,421,017 | Deloraine | May 27, 1947 |
| 2,460,202 | Tyson | Jan. 25, 1949 |
| 2,467,564 | Okrent | Apr. 19, 1949 |

FOREIGN PATENTS

| Number | Country | Date |
|---|---|---|
| 497,147 | Great Britain | Dec. 9, 1938 |